United States Patent [19]

Georg et al.

[11] 4,241,824

[45] Dec. 30, 1980

[54] CONVEYORS FOR USE IN MINERAL MINING INSTALLATIONS

[75] Inventors: Werner Georg; Gerhard Merten, both of Lunen; Helmut Langenberg, Waltrop, all of Fed. Rep. of Germany

[73] Assignee: Gewerkschaft Eisenhutte Westfalia, Westfalia, Fed. Rep. of Germany

[21] Appl. No.: 957,501

[22] Filed: Nov. 3, 1978

Related U.S. Application Data

[63] Continuation of Ser. No. 841,767, Oct. 13, 1977, abandoned, Continuation of Ser. No. 696,658, Jun. 16, 1976, abandoned.

[30] Foreign Application Priority Data

Jun. 18, 1975 [DE] Fed. Rep. of Germany ....... 2527044
Dec. 27, 1975 [DE] Fed. Rep. of Germany ....... 2558884

[51] Int. Cl.³ ............................................. B65G 25/00
[52] U.S. Cl. ..................................... 198/745; 198/517
[58] Field of Search ............... 198/517, 519, 520, 732, 198/738, 741–743, 745–749, 733, 736, 861, 735; 308/3.5; 299/18, 32–34, 43–45, 64, 65, 67

[56] References Cited

U.S. PATENT DOCUMENTS

| 3,045,811 | 7/1962 | Wenger | 198/745 |
| 3,791,037 | 2/1974 | DiCiaccio et al. | 308/3.5 |
| 3,842,966 | 10/1974 | Blumenthal et al. | 299/44 |
| 4,111,296 | 9/1978 | Glossop et al. | 198/746 |

FOREIGN PATENT DOCUMENTS

| 1115180 | 10/1961 | Fed. Rep. of Germany | 198/746 |
| 1109089 | 4/1968 | United Kingdom | 198/520 |

Primary Examiner—Joseph E. Valenza
Attorney, Agent, or Firm—Sughrue, Rothwell, Mion, Zinn and Macpeak

[57] ABSTRACT

A conveyor is composed of a series of L-shaped sections arranged end-to-end to define a conveying floor surface with a side wall at one side opposite the mineral face so as to allow material to fall onto the floor surface. The side wall has a slot or gap therein through which extends entrainment devices capable of extending across the floor surface or being stowed inwards towards the side wall. Where the conveyor is constructed as a shuttle conveyor the entrainment devices are allowed to pivot automatically between these alternate positions as they are driven back and forth along the floor surface by a reciprocating traction means. The traction means runs outside the side wall and the devices are pivotably mounted to the traction means which preferably also performs a guide function.

8 Claims, 13 Drawing Figures

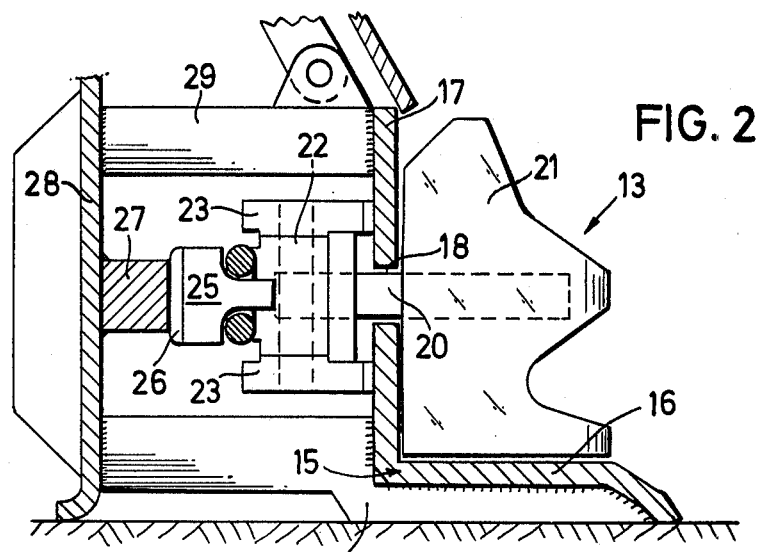
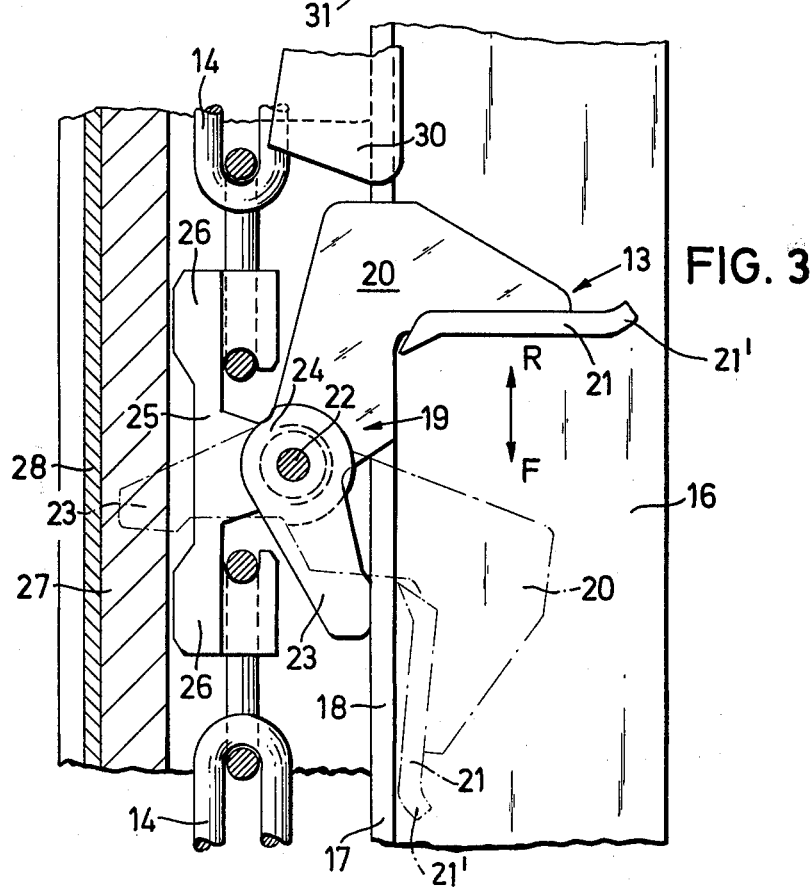

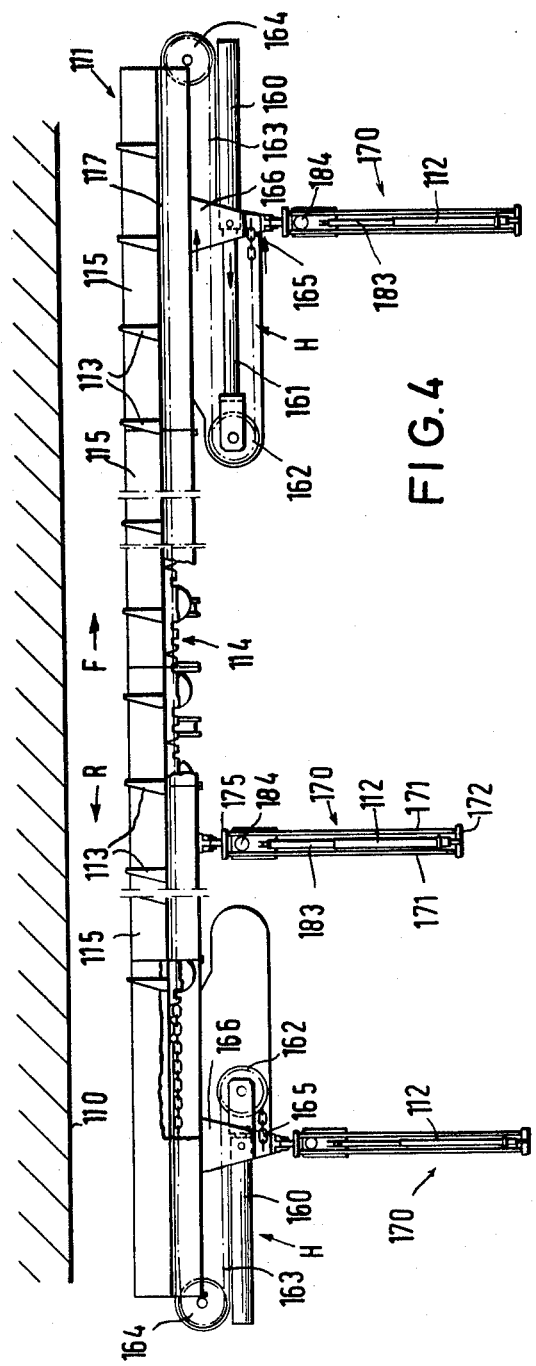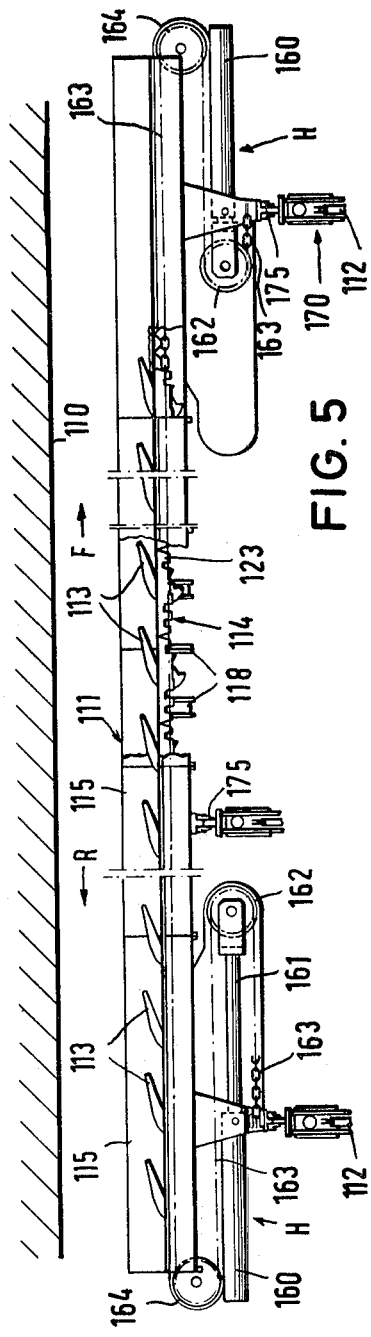

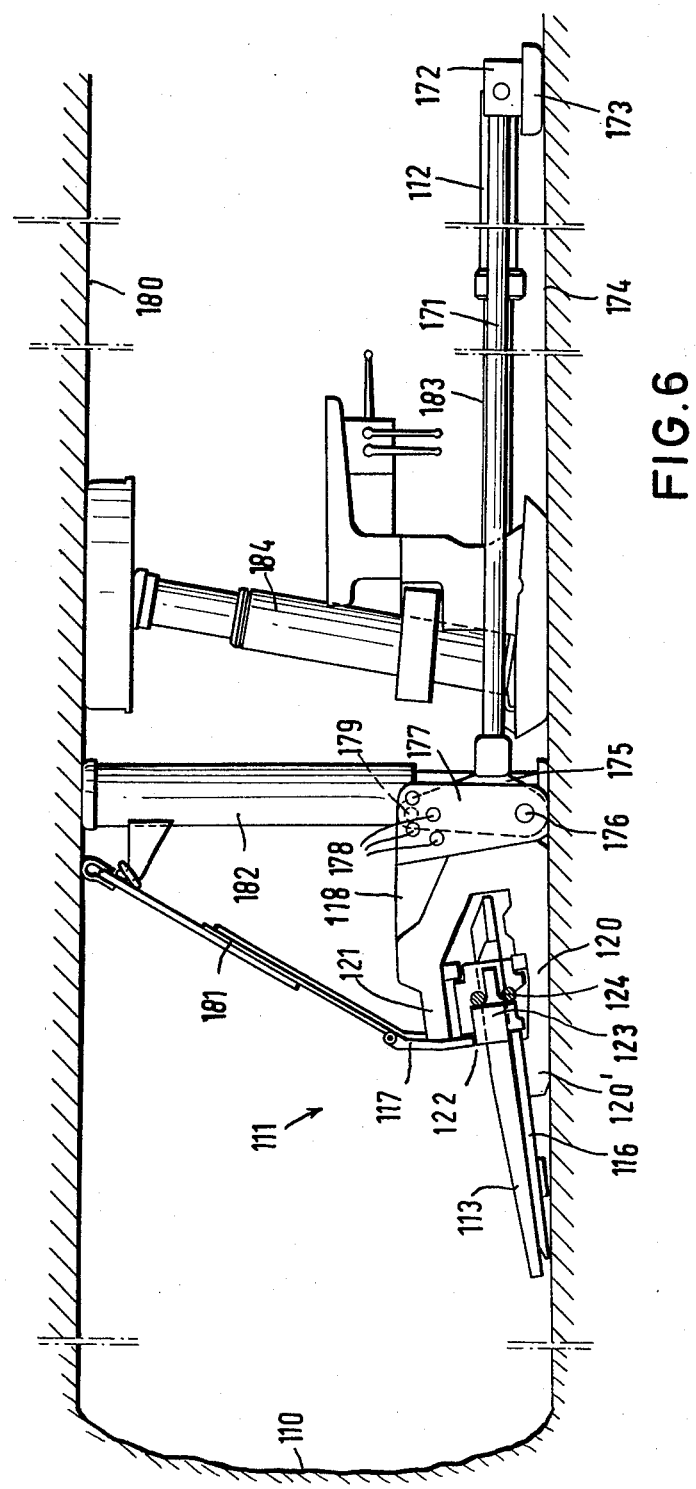

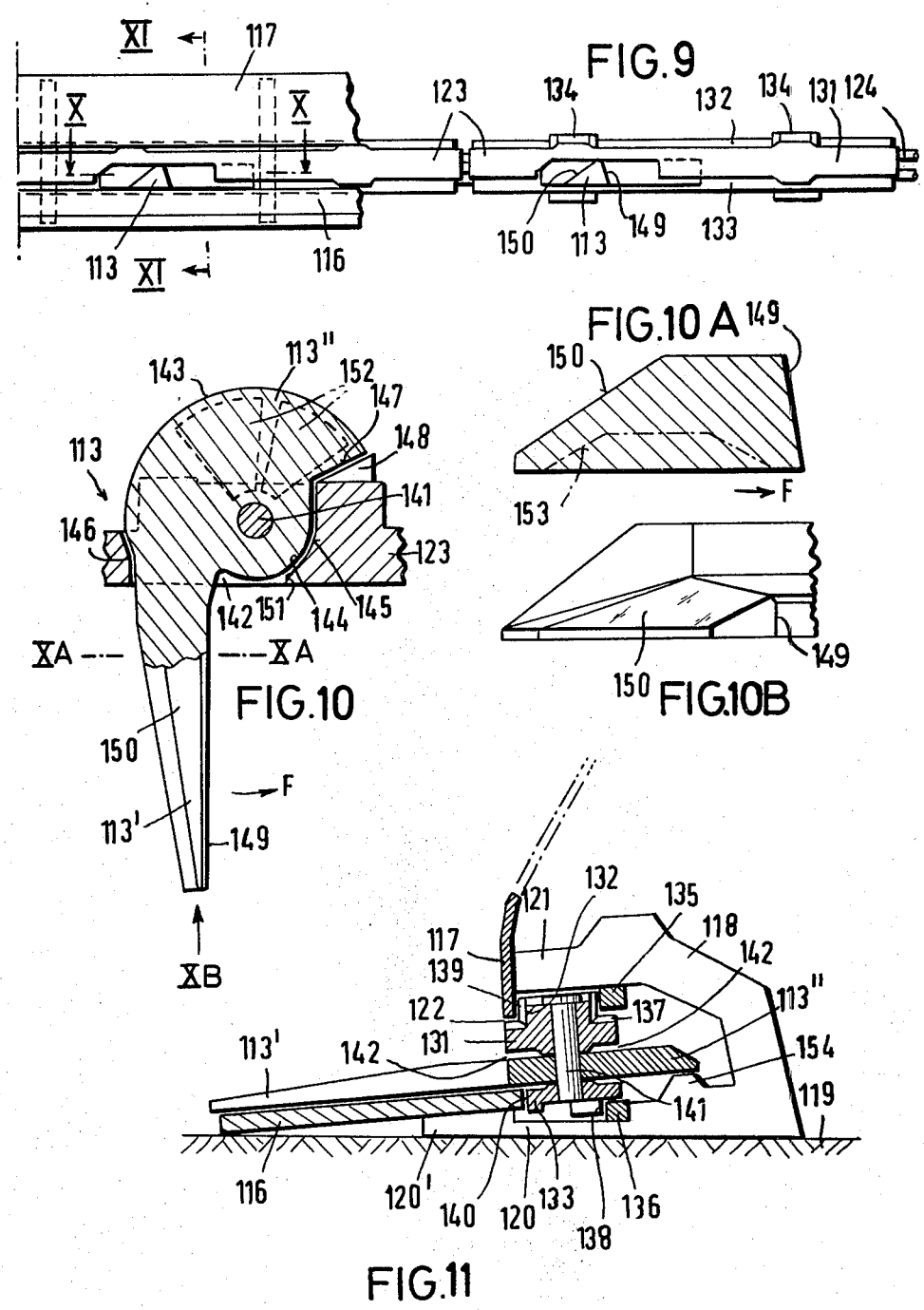

CONVEYORS FOR USE IN MINERAL MINING INSTALLATIONS

This is a continuation of application Ser. No. 841,767, filed Oct. 13, 1977, which is a continuation of Ser. No. 696,658, filed June 16, 1976, both abandoned.

BACKGROUND TO THE INVENTION

The present invention relates in general to mineral mining installations and more particularly to conveyors for use in such installations.

It is well known to transport mineral or other material, such as debris, in a mine working with a scraper chain conveyor which employs a scraper-chain assembly circulated along a series of pans. Generally such conveyors are highly efficient and robust. However, in the case where the material in question has abrasive properties, such as mineral ores with quartz or quartzite content, the conveyor parts can suffer considerable wear. Another form of conveyor is the so-called shuttle conveyor where the scrapers oscillate to and fro rather than move continuously along the channel sections. The scrapers are made to pivot between stowed positions where little material is transported and operative positions where the material is largely transported in the desired direction. Examples of shuttle conveyors are described in German Patent Specifications Nos. 1,284,894, 1,292,066 and 1,051,765. These known forms of shuttle conveyors are far less efficient than scraper chain conveyors and suffer the same disadvantages where abrasive materials are to be transported.

Generally, in both forms of conveyor abrasive materials can create considerable wear on the drive systems employed. A general object of this invention is to provide an improved form of conveyor.

SUMMARY OF THE INVENTION

In its broadest aspect the present invention provides a conveyor composed of a conveying zone defined by a conveying surface and a side wall or side wall structure at one side of the conveying surface, a plurality of material entrainment devices adapted to move along the conveying surface, the devices extending through the side wall or side wall structure and drive means for the devices located externally of the conveying zone.

The invention also provides a conveyor composed of a conveying zone defined by a conveying surface and a side wall or side wall structure at one side of the conveying surface and a plurality of entrainment devices adapted to move back and forth along the conveying surfaces in a reciprocating manner while changing position in accordance with the direction of movement, wherein the entrainment devices extend through the side wall or side wall structure and are driven externally of the conveying zone.

A conveyor made in accordance with the invention may comprise a conveying floor surface and a side wall or side wall structure generally upstanding in relation to the floor surface, a plurality of entrainment devices adapted to move back and forth along the floor surface in a reciprocating manner, the entrainment devices being pivotable so as to change position in accordance with the direction of movement wherein the entrainment devices extend through a gap in the side wall or side wall structure and are connected with traction means located externally of the side wall or side wall structure relative to the floor surface and serving to move the devices.

A conveyor made in accordance with the invention is particularly useful in the loading and transporting of high-grade hard mineral ores, such as gold ore, detached by explosive blasting since the drive system for the entrainment devices is located outside the actual conveying zone. The main body of the conveyor can be built up from L-shaped sections joined end-to-end in known manner. The side wall or side wall structure of the conveyor can then be simple side walls or plates of these L-shaped sections which walls or plates are provided with gaps or slots through which the entrainment devices extend. Alternatively, the side wall structure can be a multi part component such as a series of supports spaced apart along the working and carrying walls spaced from the conveying floor surface.

Preferably sealing means is provided to seal to the gap or slot to assist in preventing material contacting the drive or traction means running outside the side wall structure. Where the conveyor is constructed as a shuttle conveyor the drive or traction means would be oscillated back and forth along the conveyor and in this case the entrainment devices would be pivotably mounted to the traction means to permit the devices to move from a working or operative position where transportation of the material along the conveying surface occurs to an inoperative stowed position where the devices can move back through the material without affecting any appreciable movement of the material. To this end, the devices can be pivoted to the traction means on pins or joints which again lie externally of the conveying zone. In the working position the devices would normally extend across the conveying surface more or less perpendicular to the side wall structure whilst in the non-operative position the devices would be located adjacent the side wall structure. The designs proposed in accordance with the invention can lead to a particularly simple light weight construction for the conveyor. The drive system can be simplified and the traction means can be driven by simple hydraulic drive units such as piston and cylinder units.

The traction means itself may employ links or sections of chains connected together with coupling devices or guide blocks adapted to move back and forth in a passage and preferably slidably engaging with one or more guides. The entrainment devices can then be pivotably mounted to these coupling devices or guide blocks.

In one constructional embodiment, described hereinafter, the entrainment devices can be in the form of double-armed toggle levers each with one arm projecting through the side wall structure of the conveying zone and another arm disposed externally thereof. This other arm can then engage on the side wall structure or on some other component to form a stop limiting the pivotal movement of the lever and thus defining the working position. This other arm, which may be bi-furcated, can also engage on a guide when the lever pivots to its inoperative position. The main arm of each lever or device can be provided with a shaped plate which actually contacts the material being transported.

In another construction, described hereinafter, the entrainment devices are each connected to one of the aforementioned guide blocks and the devices and their guide blocks have complementary surfaces which form stops defining and delimiting the respective positions of the devices. Preferably these blocks are interconnected by chain links and have inclined mutually facing end surfaces permitting the traction means to yield. Preferably the entrainment devices and the traction means components are accessible from the exterior stowage zone and can be withdrawn for replacement purposes in this direction.

The sealing means acting on the gap or slot in the side wall structure can take a variety of forms. For example, flexible resilient strips or aprons can cover the gap and can be displaced by the entrainment devices as the latter pivot.

These sealing components can then revent to their sealing state when the devices return again. In another construction seals or packings are provided on the traction means, for example on the guide blocks or components mounting the entrainment devices and these packings may continuously contact the defining surfaces of the gap or slot in the manner of a labyrinth seal. The sealing means may also employ plate-like elements affixed to the traction means to seal the gap or slot over the regions between adjacent entrainment devices.

A frame-like housing can be provided to accommodate the drive system or the traction means for the entrainment devices by providing further walls parallel to the side wall structure and cross-pieces interconnecting these further walls to the side wall structure. This housing can be closed off at the top by flaps or hinged plates. Alternatively a series of U-shaped supports with lower portions carrying the channel sections or the floors thereof can be spaced apart along the working. Such a construction is particularly suitable to provide the accessibility referred to above.

In one constructional form the pivot axes of the entrainment devices are offset outwardly from the longitudinal axis of the traction means relative to the side wall structure and this can result in a more favourable distribution of forces.

The entrainment devices and their pivot mountings can be so constructed as to ensure that the necessary clearance between the devices and the gap or slot and between the devices and their pivot mountings do not alter in size to any significant extent as the devices pivot from one position to the other.

The portions of the entrainment devices extending over the conveying surface can be made to each assume an angle of about 10°-30° and preferably 10°-20° in relation to the side wall structure when in the inoperative position and this assists in reliably pivoting the devices to a working position where the portions each extend at about 90° to the side wall structure. In this case the height of these portions can be smaller than the gap and the guide blocks to which the devices are pivotably mounted. The portions of the devices which extend over the conveying surface may however also have a working surface for engaging on the material which is almost perpendicular, say 5°-20° off a normal to the conveying surface and a rear opposite surface which is gently inclined. This tends to force the device in question onto the conveying surface and ensures only minimal material is taken with the device as it is moved back against the transport direction and pivots to its inoperative position. The main or working portions of the devices shaped as described may also taper in plan view to widen towards the side wall structure.

The invention can also provide a conveyor which is composed of a conveying zone defined by a conveying surface and side wall means at one side of the conveying surface, a plurality of material entrainment devices extending through the side wall means, drive means located externally of the conveying zone for driving the entrainment devices back and forth over the conveying surface in a reciprocal manner and means mounting the devices to the drive means to permit automatic pivoting of the devices in accordance with the direction of movement. Alternatively where the entrainment devices are driven continuously the conveyor can be composed of a conveying zone defined by a conveying surface and side wall means at one side of the conveying surface, a plurality of material entrainment devices extending through the side wall means and drive means located externally of the conveying zone for driving the devices over the conveying surface.

The invention may be understood more readily, and various other features of the invention may become apparent, from consideration of the following description.

BRIEF DESCRIPTION OF DRAWINGS

Embodiments of the invention will now be described, by way of examples only, with reference to the accompanying drawings wherein:

FIG. 2 is a cross-sectional view of the conveyor shown in FIG. 1,

FIG. 3 is a part sectional plan view of part of the conveyor with a scale corresponding to that of FIG. 2;

FIG. 4 is a schematic plan view of a mineral mining installation employing another shuttle conveyor made in accordance with the invention with the material entrainment devices of the conveyor being shown in a working or operative position;

FIG. 5 is a view corresponding to FIG. 4 but showing the material entrainment devices in a return or non-operative position; and FIG. 6 is an end view of the installation represented in FIG. 5;

FIG. 9 is a front view of the part of the conveyor structure represented in FIG. 8;

FIG. 10 is a part-sectional plan view of one of the entrainment devices of the conveyor represented in FIGS. 4 to 9 also showing part of a guide block associated with the device.

FIG. 10A is a cross-sectional view of the entrainment device shown in FIG. 10, the view being taken along the line XA—XA of FIG. 10;

FIG. 10B is an end view of part of the embodiment device shown in FIG. 10, the view being taken in the direction of arrow XB of FIG. 10; and FIG. 11 is a cross-sectional view of the shuttle conveyor represented in FIGS. 4 to 10.

DESCRIPTION OF PREFERRED EMBODIMENTS

Figure 1:
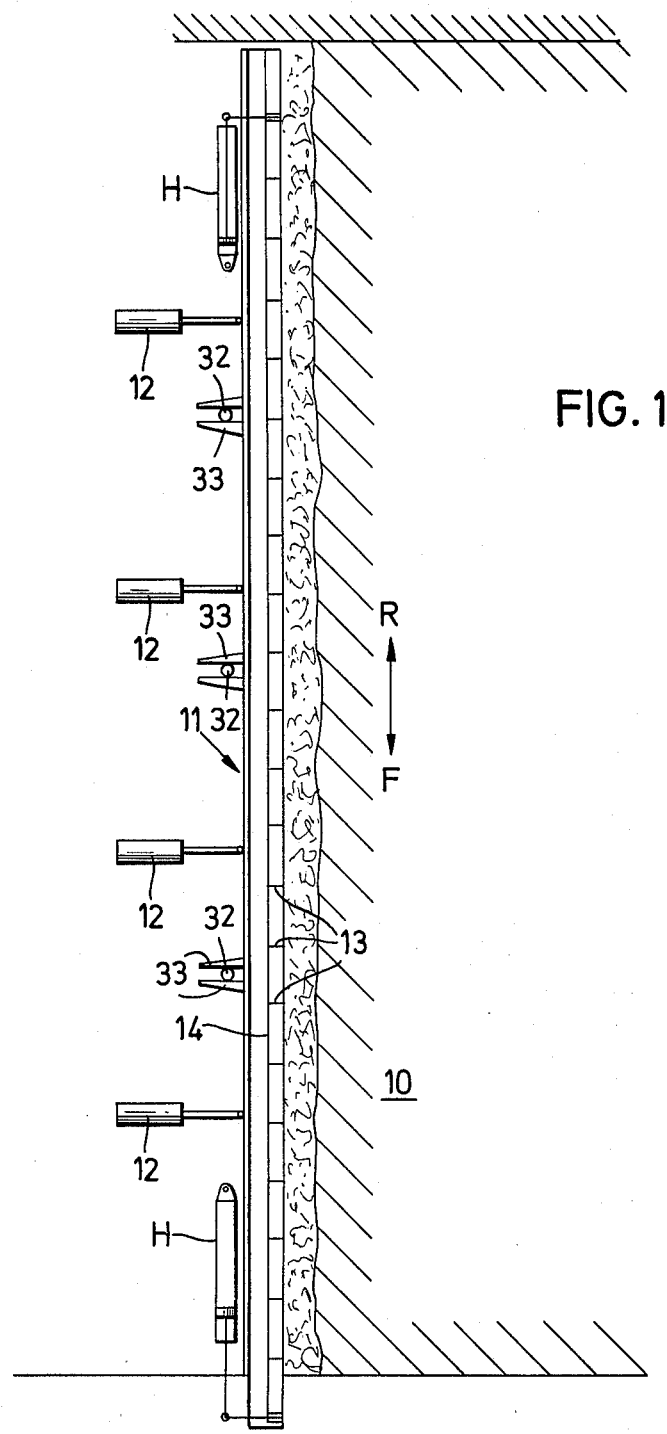
FIG. 1 is a schematic plan view of a mineral mining installation employing a shuttle conveyor made in accordance with the invention.

Referring initially to FIG. 1 a shuttle conveyor denoted 11 and made in accordance with the invention is arranged alongside a mineral face 10 of an underground working. Material, e.g., mineral ore, detached from the face 10 for example by explosive blasting, i.e., shot-firing or possibly by a cutting process is collected by the conveyor 11 and transported away in the direction of arrow F. The conveyor 11 is composed of a series of pans or channel sections arranged end-to-end and interconnected in an articulated manner to permit a certain amount of limited free movement between the individual sections. A series of shifting rams 12 is provided in known manner for displacing the channel sections towards the face 10 as the mineral-winning operation progresses.

The material is actually transported along the channel sections by the operation of entrainment devices or scrapers 13. These devices 13 are made to reciprocate back and forth along the channel sections—hence the term shuttle conveyor—and parallel to the mineral face 10 in the direction the arrows R and F. When the devices 13 are moved in the direction of the arrow F the devices adopt an operating or working position and extend generally transversally of the conveyor channel sections so as to take up the material. In contrast, when the devices 13 are moved in the reverse direction, arrow R, the devices 13 adopt a non-operative position and are retracted, for example by pivoting, towards the sides of the channel sections remote from the face 10, so that they do not move any appreciable amount of the material. By moving the device 13 back and forth in this manner the material is generally made to move in the direction of the arrow F as is desired.

The devices 13 are driven by a traction means 14, such as a chain, which is connected to piston and cylinder units H arranged at the ends of the conveyor. The cylinders of these units H can be mounted externally of the endmost channel sections while their piston rods are connected to the ends of the traction means 14. The units H are double-acting and by feeding the units H with hydraulic fluid to extend the piston of one unit and retract the piston of the other unit and vice versa the traction means 14, and hence the devices 13, can be made to reciprocate. Naturally, more than two units H can be used to drive the traction means 14 if desired.

As also depicted in FIG. 1 a series of extendible props 32 capable of being braced between the roof and floor of the working are spaced apart along the conveyor 11. The props 32 are connected to the conveyor 11 with the aid of brackets 33 which serve to prevent longitudinal movement of the conveyor during the loading and transportation of the material. It is also possible to provide additional devices for clamping or anchoring the ends of the conveyor 11.

As shown in FIGS. 2 and 3, each conveyor channel section 15 has an L-shaped cross-section with a horizontal floor 16 bent downwards at the face side to contact the floor of the working. The floor 16 of each section 15 adjoins an upstanding side wall 17 and these walls 17 define the outer side of the conveyor. Each channel section 15 is open towards the face 10 to receive the material detached therefrom. The side wall 17 of each channel section 15 has a narrow slot or opening 18 situated at about its central region. Each entrainment device 13 takes the form of a double-armed toggle lever 19 with a major portion or arm 20 extending through the slot 18 of the associated channel section 15. The arm 20 carries an upstanding plate 21 which can be integral with the arm 20 but which is preferably a separately fabricated replaceable item. This plate 21 is bent over at its laterally-outermost end 21' as shown in FIG. 3. The minor portion or arm 23 of the lever 19 is located externally of the side wall 17 of the associated channel section 15 and the lever 19 or device 13 as a whole is pivotably supported on a vertical pin 22 also located externally of the side wall 17 and generally located at the juncture between the arms 20, 23.

As shown in FIG. 2, the arm 23 is bi-furcated to permit a tongue 24 of a coupling device or guide block 25 to engage therein. The pin 22 then engages in aligned holes in the upper and lower portions of the arm 23 and in the tongue 24. The coupling devices or guides blocks 25, which also form a guide for the traction means 14, are engaged with the latter. More particularly, where the traction means 14 is a chain as illustrated, each device 25 can lock with two upstanding links of the chain to extend therebetween in the manner of a horizontal link. The devices 25 would be interposed with the links of the chain at intervals corresponding to the number and spacing of the devices 13. The devices 25 each have an exterior reinforcement 26 capable of engaging on a track 27, such as a rail or bar to thereby act as a guide. The track 27 is fixed, as by welding, to one, or more usually a series, of vertical walls 28 defining with the side walls 17 a space containing the drive system for the devices 13. These outermost walls 28 have bent over lower edges resting on the floor of the working as shown in FIG. 2. As also shown in FIG. 2 cross pieces 29 are welded between the upper regions of the walls 28, 17. A series of supports with narrow ribs 31 or similar projections are also welded beneath the floors 16 of the channel sections and these supports have extended portions which form further cross-pieces welded between the lower regions of the side walls 28, 17. In this way a rigid stable framework is formed with a box-like structure receiving the drive system. The ribs 31 or other projections are designed to engage in the floor to firmly anchor the conveyor structure and projections.

The props 32 (FIG. 1) can be used to support a protective screen or wall (not shown) in a manner generally known per se. This screen, which would usually be of multi-part construction, can engage on the conveyor, for example on the cross-pieces, and can be extended or retracted in height with the props 32 to screen off the extraction and conveying zone from the rest of the working. This is especially useful where the material is detached from the face 10 by explosive blasting since the screen can prevent loss of material.

The operation of the entrainment devices 13 is as follows: When the devices 13 are in the position shown in full lines in FIG. 3 the conveying action is performed as the devices 13 move in the direction of arrow F. The toggle levers 19, constituting the devices 13, each adopt the position shown in FIG. 3 where the end of the arm 23 locates itself against the associated wall 17 thereby forming a stop means preventing pivoting of the lever 19 in an anti-clockwise direction about the pin 22. When the traction means 14 is moved in the reverse direction however the material engaging on the plate 21 of each device 13 causes pivoting of the device 13 in a clockwise direction about the pin 22 so that the device 13 adopts a non-operative retracted position as shown in chain-dotted lines in FIG. 3 and no appreciable movement of the material occurs. In the non-operative state, the bi-furcated arm 23 of each device engages over the track 27. When the traction means 14 reverses yet again the devices 13 are swung out by pivoting on the pins 22 mainly by the material entering the wedge-shaped spaces between the side walls 17 and the shaped ends 21' of the plates 21 and thereby engaging on the ends 21' to produce a moment on the devices. Hence, the devices 13 once again adopt the working position shown in full lines in FIG. 3. The successive to-and-fro movement of the traction means is thus accompanied by automatic changes in the position of the devices 13 so that overall the material is transported along the channel section in the direction of arrow F.

The traction means 14, the devices 25 and a substantial part of each device 13 all lie in an advantageous protected position externally of the side walls 17. The thickness of the arms 20 of the devices 13 should be such that the slots 18 are almost completely closed to prevent material from passing into or through the slots 18 and jamming the drive system. Where valuable ores are being extracted it is obviously desirable to prevent any loss of material so it is desirable to provide additional means, such as resilient strips or aprons of material, such as synthetic plastics to seal off the slots 18 more reliably. Such sealing strips can be provided on the exterior of the side walls 17 and arranged to normally adopt a position substantially closing off the slots 18 unless displaced by the movement of the arms 20. Another form of sealing means usable with or as a substitute for the sealing strips is depicted in FIG. 3 by reference numeral 30. This sealing means comprises a series of plate-like members connected to horizontal links of the chain 14 and engaging in the portions of the slots 18 between the devices 13. These plate-like members 30 are preferably attached to the chain 14 so as to yield and preclude jamming especially at the junctures between adjacent channel sections 15.

The shuttle conveyor as described is comparatively simple in construction and can be fabricated quite economically.

Referring now to FIGS. 4 to 11, another shuttle conveyor made in accordance with the invention and operating in the general manner described is generally designated 111. This conveyor 111 is again located in a mine working alongside a mineral face which is here denoted 110. Material detached from the face 110 is collected by the conveyor 111 and transported by the reciprocal movement of scrapers or entrainment devices 113. The conveyor 111 is composed of a series of open pans or channel sections 115 arranged end-to-end and interconnected to permit a certain amount of free movement between the individual sections. The conveyor 111 operates in a similar manner to the conveyor 11 shown in FIGS. 1–3. Thus, as shown in FIG. 4, the entrainment devices 113 can adopt working positions extending laterally of the conveyor 111, to enable the transport of the material in the direction of arrow F, or as shown in FIG. 5 the devices 113 can be collapsed or retracted so as not to move an appreciable amount of material in the reverse direction R. The devices 113 are driven by a traction means 114 such as a chain which is drawn back and forth by drive units H.

Figure 7:
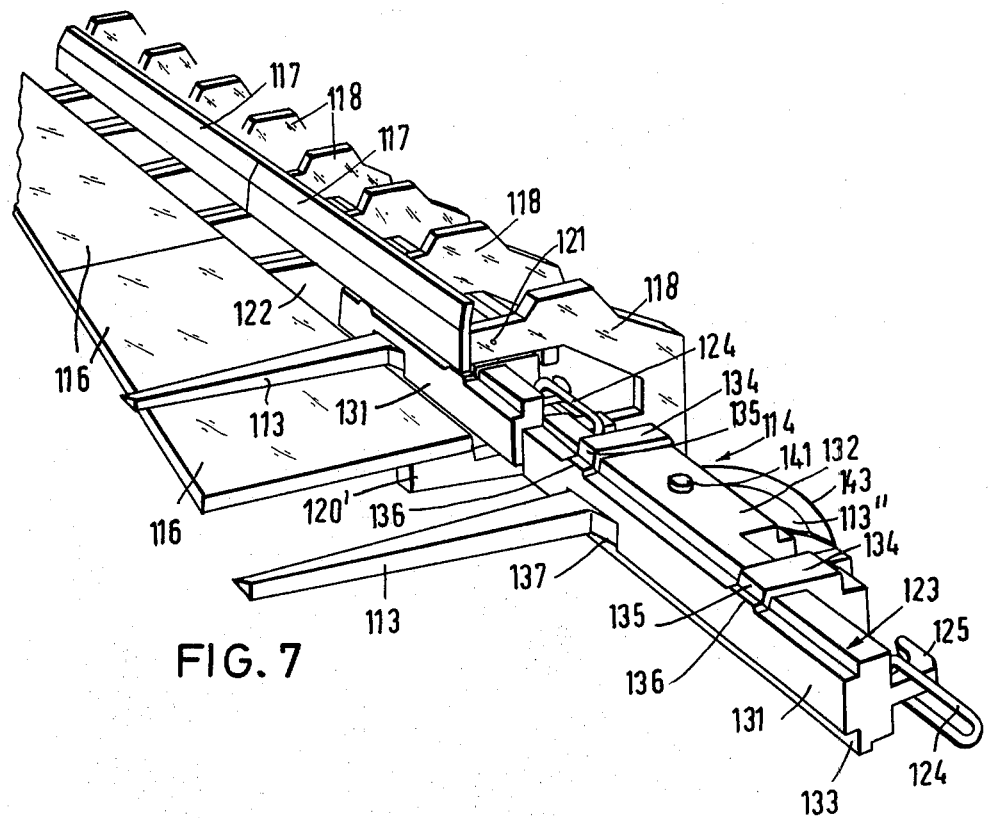
FIG. 7 is a perspective view of the shuttle conveyor represented in FIGS. 4 to 6.
Figure 8:
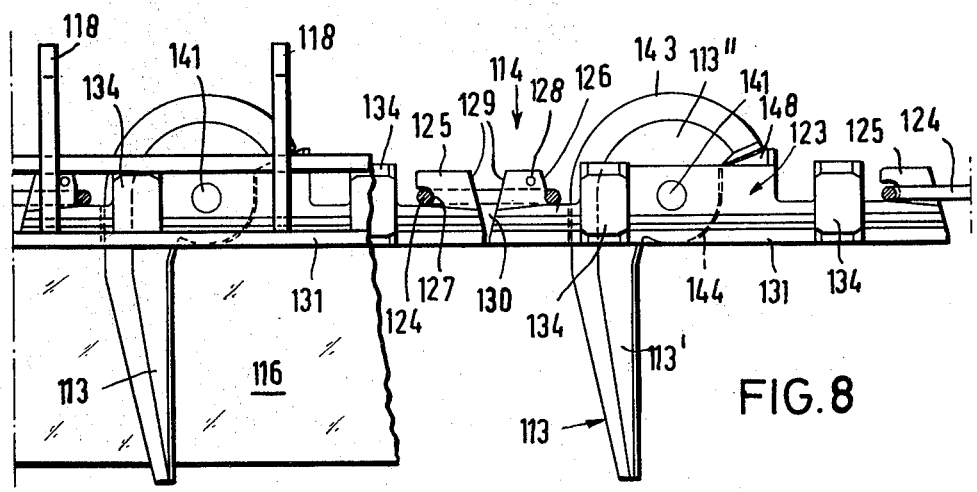
FIG. 8 is a plan view of part of the conveyor structure pertaining to FIGS. 4 to 7.

Each channel section 115 of the conveyor 111 has an L-shaped cross-section with a floor 116 inclined slightly in relation to the face 110 and a side wall structure extending substantially perpendicular to the floor 116. The channel sections 115 are connected or fixed to U-shaped support members 118 which, as shown in FIGS. 7, 8 and 11 can comprise vertical web plates which are arranged parallel to one another and spaced apart along the conveyor 111. Alternatively the members 118 can be of stouter more rigid construction such as forgings or castings. Each support member 118 has a lower portion 120 which rests on the floor 119 of the working and extends beneath the floor 116 of an associated channel section 115. The floors 116 of the sections 115 are supported on an upwardly projecting region 120' of these lower portions 120 and preferably the floors 116 are welded to the projections 120°. The corresponding upper portions 121 of the members 118 serve to locate side walls 117 which may be affixed either rigidly or detachably to the portions 121. A narrow continuous gap 122 is established between the lower edges of these side walls 117 and the upper surfaces of the floors 116 and the entrainment devices 113 locate through this gap 122. The traction means 114 runs outside the conveying zone and in a guideway defined within the members 118.

Each entrainment device 113 is pivotably supported by a guide block 123, which can be a forging or casting, formed or otherwise provided with, attachment devices 125, 126 at its ends 21. This may be best seen in FIG. 7. The individual guide blocks 123 are flexibly interconnected by means of chain links 124 which engage on their attachment devices 125, 126. As shown in FIG. 8, the attachment device 125 is more hook-like than the device 126 so that the links 124 seat in the depressions 127 formed by these devices 125. The links 124 merely engage over the devices 126 and to detachably secure the links 124 use is made of a securing means, such as pins or sleeves; engaged in bores in the devices 126.

As can also be seen in FIG. 8, the ends 129 of each block 123 are chamfered in such a way that when two adjacent blocks are aligned a V-shaped gap 130 is established between them thus permitting canting between the connected blocks 123. The gaps 130 also ensure that any material which finds its way into the region of the ends of the blocks 123 can fall unimpeded onto the floor 119.

The blocks 123 which are adapted to slide in relation to the channel sections 115 and their support members 118 are provided with sealing means designed to seal to the gap 122 as far as possible. Thus, the blocks 123 each have sealing strips 132, 133 preferably detachable for replacement purposes. These strips 132, 133 engage around the lower edges of the side walls 117 and engage on the outer edges of the floors 116 as shown in FIG. 11. The series of blocks 123 form a more or less continuous guide beam which seals the gap 22 to prevent any appreciable amount of material from passing out of the conveying zone and from jamming the drive system.

As shown in FIG. 7, each guide block 123 also carries wear-resistant reinforcements 134 which are intended to guide the block 123 for sliding and which are also preferably replaceable. As shown in FIG. 11, the members 118 are interconnected by means of parallel guide bars 135, 136 and the blocks 123 have rear corner recesses 137, 138 which receive these bars 135, 136. Similarly the blocks 123 have front corner recesses 139, 140 which receive edge portions of the walls 117 and the floors 116. In this way the blocks 123 are guided for longitudinal displacement and excessive motion laterally of the floor 116 and perpendicularly thereto is prevented.

Each entrainment device 113 is mounted for pivotal movement about an axis perpendicular to the floors 116. As shown in FIG. 11, a pivot pin 141 for each device 113 engages through bores in the device 113 and its associated guide block 123. Each device 113 can also be a forging or casting of flat plate-like form and as shown in FIGS. 10 and 11 the height or width of each device 113 is substantially less than that of the gap 122 and the associated guide block 123. Each devices 113 has, in its working position (FIG. 10), an inner portion 113' which engages over the floor 116 of the associated channel section 115 and an outer portion 113" which lies externally of the side walls structure of the section 115 and outside the conveying zone. The outer portions 113" of the devices 113 are slidably supported on their underside on projections 154 of the lower portions of the members 118 as shown in FIG. 11. The outer portion 113" of each device 113 forms part of a major body region which is shaped at its outer side edge surface 144 as the segment of a circle. On its inner side edge 144, this body region has an arcuate form and the common centre of curvature of the side edge surfaces 144, 143 lies on the axis of the associated pivot pin 141. The guide block 123 which receives the device 133 is provided with complementary surfaces 145, 146 and there are minimal clearances between the complementary surfaces 145, 143 and 144, 145 which clearances, moreover, do not change when the device 113 in question pivots about the pin 141. This assists in preventing material, especially fine material, from passing through the gap 122. The outer portion 113" of each device 113 has a planar surface 147 which is similarly matched by a complementary surface formed by stop means 148 of the associated guide block 123. When the device 113 is moved into its operative working position with the portion 113' extending across the associated channel section 115 the surface 147 engages on the stop means 148. A complementary stop mens 151 formed at the end of the surface 145 is engageable with a depression formed between the surface 144 and the working surface 149 of the portion 113' of the device 113 when the latter is pivoted to its inoperative position. As also shown in FIG. 10, the portion 113' of each device 113 tapers in plan view to narrow progressively a direction outwards from the pivot pin 141. The portion 113' also has a gently tapered rear face 150 as shown in FIG. 10A. The front working face 149 of this portion 113' is inclined more steeply, at an angle of about 10° to 30° and preferably at or nearer 10° in relation to a normal to the floor 116 therebeneath. This ensures that when the device 113 is moved in the direction of arrow F to effect transport of the material a force will be established on the face 149 tending to urge the device 113 towards the floor 116 thereby preventing all but small amounts of material from passing under the device 113. In contrast and as also shown in FIGS. 10A and 10B, the rear face 150 of the portion 113' of each device 113 tends to rise gradually in the direction of arrow F so that as the device 113 is pivoted to its inoperative position when moved in the direction of arrow R the material can ride over the device 113 without any appreciable amounts of material becoming transported in this reverse direction R.

It is arranged that in the working position, FIGS. 4 and 10, the portion 113' of each device 113 or more particularly the working face 149 thereof extends perpendicular to the side walls 117 but in moving from the working position to the inoperative position the portion 113' only moves through an angle of about 70°-80°. This then means that in the inoperative position of each device 113' where the stop 151 is operative, the portion 113' of the device 113 extends at an angle of about 10°-20° in relation to the side walls 117. Such design ensures the devices 113 will pivot reliably to the working position at the commencement of the movement in the direction of arrow F.

The underside of the portion 113" of each entrainment device 113 can be provided with recesses 152 indicated in dotted outline in FIG. 10 whilst the portion 113' can have recesses 153 on the underside as indicated in dotted outline in FIG. 10A. These recesses 152, 153 serve to reduce the amount of material used and hence the weight of the devices 113 can be reduced accordingly. Furthermore the presence of the recesses 152, 153 can tend to counteract the tendency for the device 113 in question to rise or climb as fine material becomes trapped underneath.

As can be seen in FIGS. 7 and 8, the pivot pins 141 for the devices 113 lie outside the longitudinal centre of the guide blocks 123 and the distance between two slidable reinforcements 134 is at least equal to or greater than the length of the portions 113' of the devices 113. This ensures that the sliding and guide forces can be maintained at desirable levels when the devices 113 actually transport material along the sections 115. The pins 141 are generally accessible from the stowage side of the installation and hence a pin 141 can be withdrawn to allow the associated device 113 to be removed and replaced from the stowage side.

The guide beam formed by the interconnected guide blocks 123 constitutes at least part of the traction means 114 and the beam is also accessible for replacement purposes from the stowage side. The beam can be coupled to the drive units H by means of additional lengths of chain. As shown in FIGS. 4 and 5, the drive units H are double-acting hydraulic piston and cylinder units 160 with cylinders mounted at the ends of the conveyor 11. Each unit 160 has a piston rod 161 to which a drive chain wheel 162 is mounted. Chain sections 163 are connected to the ends of the guide beam composed of the blocks 123 and their connection links 124. These chain sections 163 are entrained around an intermediate chain wheel 164 and the drive chain wheels 162 and are fixed, as at 165, to brackets 166 rigidly connected to the conveyor 111. The chain sections 163 can extend through the chain wheels 164, 162 several times so that when the units 160 are charged with fluid to alternately extend and retract their piston rods 161, the guide beam is caused to oscillate at a speed somewhat greater than the movement of the piston rods 161. Other drive arrangements can be employed instead of the hydraulic units 160. For example, reversible hydraulic motors or electric motors can be employed. Where the conveyor is of moderate capacity and length, drive units at each end will usually provide sufficient power but where extra power is needed, for instance with a bigger construction, then one or more intermediate drive units can be provided to assist in driving the devices 113 back and forth.

It is desirable to provide means for shifting the conveyor 111 up towards the face 110 as the mineral winning progresses. As shown in FIGS. 4 and 6 in the installation represented shifting rams 112 with auxiliary adjusting devices are provided for this purpose. The purpose of the adjusting devices, denoted 170, is to enable the angle of inclination of the channel sections 115 to be varied and this function will now be described. Each device 170 is composed of two parallel arms 171 interconnected at their outer ends with the aid of a transverse yoke 172 which seats on a skid 173 resting on the floor of the working here denoted 174. The arms 171 which extend on either side of one of the shifting rams 112, are also interconnected at their inner ends with the aid of a cross piece 175. The ram 112 is pivotably connected to the yoke 172 while the cross piece 175 is articulated with a pin 176 to a bi-furcated mounting 177 connected to the associated section of the conveyor 111 via the support members 118 thereof. The mounting 177 is provided with offset bores 178 disposed above the pin 176 and the cross piece 175 also has a bore 179 which can be aligned with one of the bores 178 by pivoting the cross piece 175 about the pin 176. The arms 171 can thus be made to assume various angular positions by aligning the bore 179 with different bores 178 and by inserting a locking pin through the bores thus aligned. Since the arms 171 effectively engage on the floor 174 through the skid 174 the angle of inclination of the conveyor 118 and more particularly the floors 116 can be controlled and varied in this manner. This is especially advantageous since even in the case where the floor 174 ascends towards the face 110 the adjustment provided by the devices 170 enables the floors 116, combining to form the collective conveyor floor, to incline in the manner shown in FIG. 6. This in turn tends to stabilize the entire conveyor and ensures that even during explosive blasting of the face 110 the conveyor 111 will not tilt over away from the face 110.

As shown in FIG. 6 the piston rods 183 of the rams 112 are each articulated to a hydraulic prop 184 capable of being set between the floor 174 and the roof 180 of the working to act as an abutment for the ram 112. Thus, with the prop 184 braced, the ram 112 can be retracted to transmit shifting force through the yoke 72 and the arms 171 to the conveyor 111. Conversely, with the prop 184 relieved the ram 112 can extend to displace the prop 184 with the conveyor 111 acting as an abutment. Further extendible props 182 are provided at the outer side of the conveyor 111 as illustrated in FIG. 6 and a multi-part screen 181 is arranged between the props 182 and the side walls 117. The screen 181, which can be raised and lowered by operating the props 182, serves to screen off the working zone when explosive blasting is being effected to prevent loss of material and protect personnel. In the same manner as the installation shown in FIGS. 1 to 3 the drive system for the devices 113 is again well protected and disposed outside the conveying zone and this is especially advantageous where the mineral ore in question has highly abrasive properties. Any fine material which does find its way into the passageway for the traction means 114 will tend to fall onto the floor of the working thus precluding jamming of the drive system. The space defined by the members 118 can also be used to accommodate a water supply system with spray nozzles distributed over the length of the installation to clean the traction means 114 and its guideway as well as the chain wheels. Additionally or alternatively a lubrication system can be accommodated within the members 18 to supply lubricant to the components as necessary.

Since the channel sections 115 and the guide blocks 123 are flexibly interconnected it is possible to arrange for sufficient free movement to enable part of the conveyor to be offset vertically or horizontally if conditions require this. It is also possible to make the conveyor take a curvilinear course. It is also possible to arrange for the conveyor to have an end part which discharges into a roadway at the end of the working face and which is at 90° to the remainder of the conveyor.

We claim:

1. A shuttle conveyor for use in mineral mine workings, said conveyor comprising:
   a series of pans arranged end-to-end, each pan having a floor plate along which material is conveyed and a side wall generally upstanding relative to said floor plate, the side walls of the pans defining a conveying zone disposed above the floor plates and a driving zone disposed externally of the conveying zone, the side wall of each pan having a first side facing the conveying zone and a second side facing the driving zone, the side wall of each pan having a slot therein extending longitudinally of the conveying zone, said slot being spaced above the floor plate to separate the side wall into upper and lower portions and establishing direct communication between the conveying and driving zones;
   further side walls, and upper and lower longitudinally spaced cross piece supports secured at said ends to said side walls and said further sidewalls respectively to space said further side walls of said pans and forming an open, rigid stable framework defining the driving zone, whereby any mineral mine working entering the driving zone may fall freely onto the floor of the working to prevent jamming of the drive system;
   a plurality of material entrainment devices for conveying material along the conveying zone and over the floor plates of the pans, each of said devices having a first part located in the driving zone, each of said devices extending through one of the slots in the side walls of the pans and having a region closely fitting within the slot to inhibit the passage of material from the conveying zone to the driving zone;
   drive means including a multi-part articulated reciprocal traction means located in the driving zone for driving the devices in unison back and forth in reciprocal manner in first and second directions, whereby said devices convey material along the conveying zone in said first direction and return predominantly without conveying material in said second direction, the traction means being composed of guide blocks articulately interconnected by chain links;
   pivotal mounting means mounting the second parts of the deivces to the guide blocks of the traction means to permit said devices to pivot automatically between a working position wherein the first parts of the devices extend generally laterally outwards from the first sides of the side walls of the pans and over the floor plates of the pans when the drive means moves the devices in the first direction and an inoperative position wherein the first parts of the devices are stowed adjacent the first sides of the side walls of the pans when the drive means moves the devices in the second direction;
   stops formed by faces of the second parts of the devices for engaging the second sides of the side walls of the pans to maintain the devices in the working position when the drive means moves the devices in the first direction; and
   guide means carried by said further side walls to slidably contact the guide blocks thereby to guide the traction means during its reciprocal movement.

2. A shuttle conveyor for use in mineral mine workings, said conveyor comprising:
   a series of L-shaped pans arranged end-to-end, each pan having a floor plate along which material is conveyed and a side wall generally upstanding relative to said floor plate, the pans defining a conveying zone disposed above the floor plates, the side walls each having a first side facing the conveying zone and a second side opposite therefrom;

longitudinally spaced support means supporting the floor plates of the pans from their undersides and suspending the side walls at a position spaced above the floor plates forming a rigid, stable open framework to receive a drive system such that any fine mineral mine working entering the driving zone may fall freely onto the floor of the working to prevent jamming of the drive system, said side walls being spaced above said floor plates to produce an elongate slot extending longitudinally of the conveying zone between the lowermost surfaces of the side walls and the uppermost surfaces of the floor plates, with said support means at least partially defining a driving zone externally of the conveying zone with the second sides of the side walls of the pans facing the driving zone and the slot establishing direct communication between the conveying and driving zones;

a plurality of material entrainment devices for conveying a material along the conveying zone and over the floor plates of the pans, each of said devices having a first part located in the conveying zone and a second part located in the driving zone, each of said devices extending through the slot;

drive means including a multi-part articulated reciprocal traction means located in the driving zone for driving the devices in unison back and forth in reciprocal manner in first and second directions, whereby said devices convey material along the conveying zone in said first direction and return predominantly without conveying material in said second direction, the traction means being composed of guide blocks interconnected by chain links;

pivotal mounting means mounting the second parts of the devices to the guide blocks of the traction means to permit said devices to pivot automatically between a working position, wherein the first parts of the devices extend generally laterally outwards relative to the first sides of the side walls of the pans and over the floor plates of the pans when the drive means moves the devices in the first direction and an inoperative position, wherein the first parts of the devices are stowed adjacent the first sides of the side walls of the pans when the drive means moves the devices in the second direction;

guide means carried by the support means to slidably contact the guide blocks and guide the traction means during its reciprocal movement;

sealing means for engaging between the guide blocks and the slot to inhibit the passage of material from the conveying zone to the driving zone; and stops formed by complementary faces of the second parts of the devices and the guide blocks which engage to maintain the devices in the working position when the drive means moves the devices in the first direction.

3. In a shuttle conveyor for use in underground mineral mining installations and comprising:

a series of pans arranged end-to-end, each pan having a floor plate along which material is conveyed and a side wall generally upstanding relative to the floor plate, the pans defining a conveying zone disposed above the floor plates with the side wall of each pan having a first side facing the conveying zone and a second side opposite therefrom, longitudinally spaced supports connected at least to said side walls and said floor plates and defining an open, rigid stable framework and forming a driving zone disposed externally of the conveying zone, whereby any fine mineral mining material entering the driving zone may fall freely onto the floor of the working to prevent jamming of a drive system within said driving zone, the second sides of the side walls of the pans facing said driving zone, slot means extending longitudinally of the conveying zone and providing direct communication between the driving and conveying zones, a plurality of material entrainment devices for conveying material along the conveying zone and over the floor plates of the pans, each of said devices having a first part located in the conveying zone and a second part located in the driving zone, each of said devices extending through said slot means, drive means including elongate traction means located in the driving zone for driving the devices in unison back and forth in reciprocal manner in first and second directions, whereby said devices convey material along the conveying zone in said first direction and return predominantly without conveying material in said second direction, pivotal mounting means mounting the second parts of the devices to the traction means to permit said devices to pivot automatically between a working position wherein the first parts of the devices extend generally laterally outwards from the first sides of the side walls of the pans and over the floor plates of the pans when the drive means moves the devices in the first direction and an inoperative position wherein the first parts of the devices are stowed adjacent the first sides of the side walls of the pans when the drive means moves the devices in the second direction;

stop means on the second parts of the devices for maintaining the devices in the working position when the drive means moves the devices in the first direction; the improvement comprising the traction means composed of a plurality of elongate guide blocks spaced apart longitudinally of the conveying zone and interconnected by means of closed chain links permitting relative articulation, the pivot mounting means serving to pivotably mount each of the entrainment devices to a respective one of the guide blocks, and guide means in the driving zone for slidably engaging solely with the guide blocks to guide the traction means during its reciprocal movement.

4. A conveyor according to claim 3, wherein the guide blocks are provided with sealing means for sealing engagement with the slot means to prevent the passage of material between the conveying and driving zones.

5. A conveyor according to claim 3, wherein the guide blocks have hook-like ends receiving the chain links.

6. A conveyor according to claim 3, wherein the facing ends of adjacent guide blocks are inclined in relation to one another.

7. A conveyor according to claim 3, wherein the second parts of the devices are received within apertures in the guide blocks.

8. A conveyor according to claim 3, wherein the guide means comprise a plurality of guide rails engaging with the guide blocks at different locations.

* * * * *